Dec. 3, 1935.  E. LYSS  2,022,920
REVOLVING FAN
Filed July 3, 1935
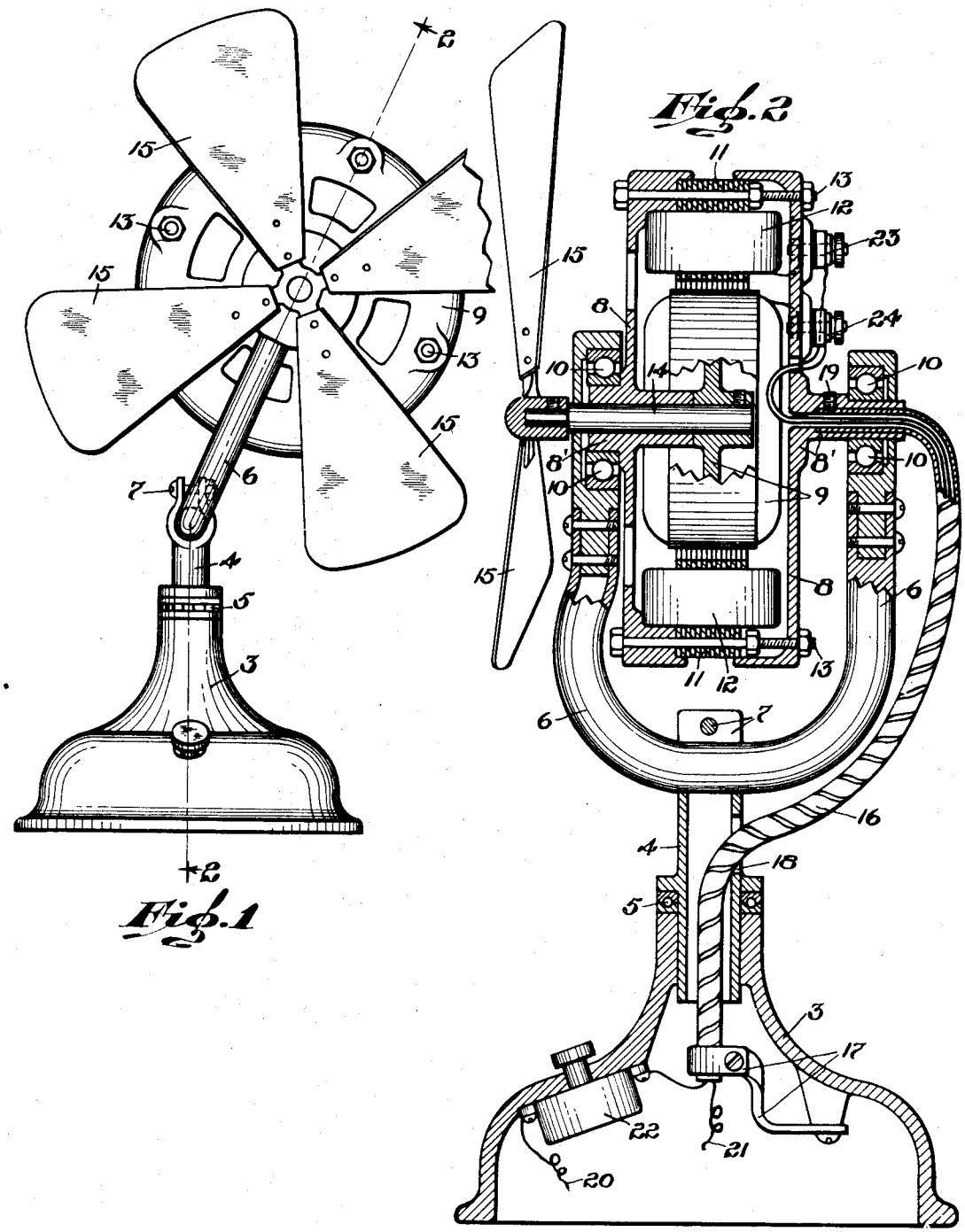
INVENTOR.
Eric Lyss
BY
ATTORNEY.

Patented Dec. 3, 1935

2,022,920

UNITED STATES PATENT OFFICE 2,022,920

REVOLVING FAN

Eric Lyss, Pasadena, Calif., assignor of one-third to William R. Litzenberg, Los Angeles, Calif.

Application July 3, 1935, Serial No. 29,661

6 Claims. (Cl. 230—254)

My invention relates to revolving fans, and more particularly to motor driven fans supported to be revolved bodily about an axis at right angles to its axis of rotation; and it has among its salient objects to provide a new construction and arrangement, whereby the electric wires are connected in such a way as to permit of such continuous revolution of the motor and fan about an axis at right angles to the axis of the fan proper, without the use of commutator and brushes to maintain a flow of current to the revolving parts, and without twisting the electric wires so as to injure them in any way.

I accomplish this novel object by rotatably supporting the two parts of the motor—the stator and the armature—in bearings in a suitable bracket or yoke which will permit both parts of said motor to rotate independently, one within the other, that is: said stator is rotatably supported in said bracket or yoke, and the armature is also rotatably supported in said bracket or yoke, said armature being within the stator. The fan proper is preferably connected to, and rotates with, the axle of the armature, while the electric wires for supplying the current are connected through the axle of the stator with the windings thereof. With this arrangement, it will be understood that the stator is mounted to rotate freely in either direction and independently of the armature, and that the armature and fan proper rotate freely and independently of said stator.

By mounting the stator so that it can rotate freely about a horizontal axis, for example, and then passing the electric wires up through the vertical axis of revolution of the motor and fan bodily, and thence through the horizontal axle of said stator and attaching them to the windings thereof, it will be understood that as said motor and fan revolve bodily around said vertical axis that said electric wires will be twisted thereby from their upper ends. Now if said stator, to which said wires are attached, is simultaneously rotated about its horizontal axis, it will operate to untwist said electric wires as they are twisted by the revolving movement of the entire motor and fan about the vertical axis.

As one means for turning said stator for the purpose of untwisting the electric wires as they are twisted by the revolving movement of the motor and fan bodily, I have provided a spring spiral of tubular form, through which the electric wires pass, said spring spiral being anchored at one end to the fixed or stationary base or support, through the vertical axis thereof, while the other end of said spring spiral is attached fixedly to the axle of said stator to turn therewith. Thus said spring spiral is also twisted with the electric wires by the revolving movement of the motor and fan bodily, but by reason of the torque tension thereof it operates to turn said stator to untwist said spring spiral and said elecric wires, so that the operation is to untwist as it twists, that is: said spring spiral causes an untwisting rotation of the stator as the spring spiral and electric wires therein are twisted by the bodily revolutions of the whole structure upon the fixed base or support.

When the terms "vertical axis" and "horizontal axis" are used in this specification, it is to be understood that axes at right angles to each other are meant to be included, whether or not said axes are vertically and horizontally disposed.

In order to explain my invention more fully, I have shown one practical embodiment thereof on the accompanying sheet of drawing, which I will now describe.

Figure 1 is a front elevation of an electric fan embodying my invention; and

Figure 2 is a sectional view, on a larger scale, taken on the line 2—2 of Fig. 1.

Referring now in detail to the drawing, 3 designates a base or support which can be of any suitable form, having a tubular bearing member or stem, 4, mounted to turn freely on the ball bearings 5, said bearing member having adjustably mounted therein a yoke or bracket 6, held in different positions of adjustment, to one side or the other of the vertical axis extended, as indicated in Fig. 1, by means of a clamp 7.

Mounted in said supporting yoke is an electric motor, the two parts of which—the stator, designated 8, and the armature, designated 9—are independently and rotatably supported therein. Said stator 8 is provided in the opposite sides of its casting or body with tubular axles, as 8', 8', turning in ball bearings 10, 10, supported in the opposite sides of said yoke or bracket, as clearly shown in Fig. 2. Said stator can be of any suitable type and is here shown with the usual laminations 11 and windings 12, held together in the body castings by means of bolts 13, 13.

The armature 9, with its spider and windings, is secured to the inner end of a shaft 14, extended through and supported by the tubular axle 8' of the stator, substantially as shown, and is provided at its outer end with a fan 15. Thus said armature can revolve freely within the stator and rotates the fan therewith.

By reference to Fig. 1, it will be seen that the yoke supporting the motor and fan is offset to one side of the vertical axis of the tubular member 4, whereby the back thrust made by the fan causes said motor and fan to revolve bodily around the vertical axis of said supporting member 4, said member revolving in the ball bearings 5, as clearly indicated.

As one means for causing said stator to rotate about its horizontal axis, I have shown a spring spiral member 16, which anchored at its lower end to the base by means of a bracket 17, said spring spiral member extending thence upwardly through the tubular member 4, and out through a side opening 18 in said member, and at its upper end inserted into the horizontally disposed tubular axle 8' at the right hand side of said stator and secured thereto as by means of a set screw 19, whereby the upper end of said spring spiral member 16 is turned with said stator about its horizontal axis.

The electric wires, designated 20—21, are shown in the base 3, with a switch 22, which can be of any desired type, for opening and closing the circuit, said wires being extended upwardly through said spring spiral member 16, and into the stator as indicated, where they are connected with the winding of said stator through the terminals 23 and 24 thereon. Thus when the switch 22 is turned to close the electric circuit, the armature and the fan are started. The back thrust of the fan causes the motor and fan to move backwardly about the vertical axis with the tubular member 4, in the ball bearings 5. As the motor and the yoke 6 are thus caused to revolve around said vertical axis, it will be seen that the spring spiral member 16, and the electric wires therein, will be twisted, because the lower end of said spiral member is held fast in the fixed base. Only a few turns on said spring spiral member 16 will increase its tension sufficiently so that it will turn said stator in a direction to untwist said member 16, and said electric wires, and as said stator is free to turn, it will be turned by the tension of the spring spiral member 16, and will, therefore, permit the untwisting of said spring member 16 as it is twisted, and will also untwist the electric wires therein.

Thus I have provided an electric fan so mounted that the motor and fan can be moved bodily by the back thrust of the fan about one axis, while the fan itself rotates about its own axis at right angles to said first axis, with means, other than commutator and brushes, or other wiper contacts, for maintaining the continuous flow of electric current. In other words, I have provided such a revolving and rotating arrangement with straight electric wires permanently connected from the source of supply to and through the structure to the stator windings of the motor. This is made possible by mounting the stator so that it can be rotated to compensate for any twisting of the electric wires caused by the bodily revolutions of the structure. And as one means for rotating said stator to cause the untwisting of said wires, I have shown a spring spiral member anchored at one end to the base or support, and at the other end to the stator itself, the torque tension of said spring spiral member being such as will turn the stator to untwist said electric wires as they are twisted by the bodily revolutions of the structure.

I am aware that positive gear connections could be provided for so turning said stator to bring about this untwisting rotation thereof during the bodily revolutions of the motor and fan about an axis at right angles to the axis of the fan propeller, but I have shown this simple and practical spring spiral member as one means for accomplishing it.

I do not, therefore, limit the invention to the details of construction and arrangement shown for explanatory purposes, except as I may be limited by a liberal construction of the hereto appended claims forming a part hereof.

I claim:

1. An electric motor driven fan including a motor having a stator and an armature, means for rotatably supporting both, one within the other, means for supporting said motor to rotate bodily about an axis at an angle to the axis of rotation of said stator and armature, electric wires extended through the axis of the supporting means for the motor to said stator, whereby said wires are twisted as said motor revolves in said supporting means, a fan connected to be driven by said armature, and means connected with said stator and with the supporting means for said motor for turning said stator to untwist said wires as they are twisted.

2. An electric motor driven fan including a motor having a stator and an armature, means for rotatably supporting both, one within the other, means for supporting said motor to rotate bodily about an axis at an angle to the axis of rotation of said stator and armature, a fan connected with said armature to be driven therewith, electric wires extended through the axis of the supporting means for the motor to said stator, whereby said wires are twisted as said motor revolves in said supporting means, and a resilient torsion member connected at one end with said stator and at its other end with the supporting means for said motor, for turning said stator to untwist said wires as they are twisted by the rotation of said motor and fan in said support.

3. An electric motor driven fan including a motor having a stator and an armature, means for rotatably supporting both, one within the other, means for supporting said motor to rotate bodily about an axis at an angle to the axis of said stator and armature, a fan connected with said armature to be driven therewith, electric wires extended through the axis of the supporting means for said motor and through the axis of said stator and connected with said stator for supplying current thereto, a spring spiral member enclosing said electric wires and anchored at one end to said supporting means for said motor and at its other end attached to said stator for turning the same, the rotation of said motor in said supporting means operating to twist said electric wires, said spring spiral member operating to turn said stator to untwist said wires as they are twisted.

4. An electric motor having a stator and an armature, means for supporting said stator and said armature one within the other, both being rotatable independently of each other, electric wires connected with the windings of said stator through the axis thereof, whereby the turning of said stator twists said wires, and a tension member connected with said stator and operable to yieldingly turn said stator to its neutral position to untwist said electric wires.

5. In an electric motor fan, a motor, means rotatable supporting both the stator and the armature thereof, one within the other, a fan connected to be driven by said armature, means revolubly supporting said motor fan to turn bodily about an axis at right angles to the axis of said stator and armature, electric wires extended through the support for said motor and through the axis of said stator and connected with the windings of said stator for furnishing electric current thereto, the revolving of said motor and fan in said support operating to twist said electric wires, and means connected with said support for said motor fan and to said stator and operable as said motor and fan revolve bodily to rotate said stator to untwist said electric wires as they are twisted by the revolutions of said motor and fan in said support.

6. An electric fan including in combination a supporting member, a yoke adjustably mounted on said support, a motor in said yoke, said motor including a stator and an armature, means rotatably supporting said stator and said armature one within the other in said yoke, a fan connected to be driven by said armature, means rotatably supporting said yoke and motor in said supporting member to turn about an axis at right angles to the axis of said stator and armature, electric wires extended through said supporting member and to said stator through the axis thereof, the revolving of said yoke and motor operating to twist said wires, and means connected with said support and with said stator and operable during the revolutions of said yoke and motor in said supporting member to turn said stator to untwist said electric wires as they are twisted by the revolutions of said motor and fan in said supporting member.

ERIC LYSS.